(12) United States Patent
Maeda et al.

(10) Patent No.: US 10,709,002 B2
(45) Date of Patent: Jul. 7, 2020

(54) COMMUNICATIONS DEVICE

(71) Applicant: Panasonic Intellectual Property Management Co., Ltd., Osaka (JP)

(72) Inventors: Hikaru Maeda, Osaka (JP); Shinichiro Kurihara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/355,295

(22) Filed: Mar. 15, 2019

(65) Prior Publication Data

US 2019/0306958 A1    Oct. 3, 2019

(30) Foreign Application Priority Data

Mar. 28, 2018  (JP) ................. 2018-063322

(51) Int. Cl.
*H05B 47/19*   (2020.01)
*H05B 47/11*   (2020.01)

(52) U.S. Cl.
CPC ............. *H05B 47/19* (2020.01); *H05B 47/11* (2020.01)

(58) Field of Classification Search
None
See application file for complete search history.

(56) References Cited

U.S. PATENT DOCUMENTS

| | | | |
|---|---|---|---|
| 8,232,745 B2* | 7/2012 | Chemel | F21S 9/043 315/308 |
| 8,779,670 B2* | 7/2014 | Kato | G01J 1/0228 315/159 |
| 9,072,133 B2* | 6/2015 | Chemel | H05B 33/08 |
| 9,125,254 B2* | 9/2015 | Chemel | F21V 29/56 |
| 9,220,156 B2* | 12/2015 | Bishop | H05B 47/16 |
| 9,326,364 B2* | 4/2016 | Maeda | H05B 47/105 |
| 9,538,608 B2* | 1/2017 | Gerszberg | H05B 47/155 |
| 9,854,652 B2* | 12/2017 | Kurihara | H05B 47/19 |
| 10,004,128 B2* | 6/2018 | Recker | H05B 47/105 |
| 10,251,249 B2* | 4/2019 | Kurihara | H05B 47/16 |

(Continued)

FOREIGN PATENT DOCUMENTS

| | | |
|---|---|---|
| JP | 2005-528852 A | 9/2005 |
| WO | 03/103222 A2 | 12/2003 |

*Primary Examiner* — Amy Cohen Johnson
*Assistant Examiner* — Srinivas Sathiraju
(74) *Attorney, Agent, or Firm* — Renner, Otto, Boisselle & Sklar, LLP

(57) ABSTRACT

A control unit in a communications device, upon receipt of information from a first lighting device, transmits the information from the first lighting device to a second lighting device and enters a single protocol state in which wireless communication is performed exclusively via a second communications protocol, until the communications device receives a response to the transmission. Upon receipt of information from the second lighting device, the control unit transmits the information from the second lighting device to the first lighting device and enters a single protocol state in which wireless communication is performed exclusively via a first communications protocol, until the communications device receives a response to the transmission. Upon receipt of either of the responses by the communications device, the control unit enters a multiprotocol state in which wireless communication is possible via the first and second communications protocols.

5 Claims, 4 Drawing Sheets

(56) References Cited

U.S. PATENT DOCUMENTS

| | | | |
|---|---|---|---|
| 10,285,241 B2* | 5/2019 | Recker | H05B 47/10 |
| 10,356,887 B2* | 7/2019 | Maeda | H04L 67/10 |
| 10,383,199 B2* | 8/2019 | Aggarwal | H04W 4/70 |
| 2005/0221752 A1 | 10/2005 | Jamieson | |
| 2009/0284169 A1* | 11/2009 | Valois | H05B 47/18 |
| | | | 315/291 |
| 2010/0327766 A1* | 12/2010 | Recker | H05B 45/00 |
| | | | 315/291 |
| 2012/0086345 A1* | 4/2012 | Tran | H04B 10/40 |
| | | | 315/158 |
| 2013/0099678 A1* | 4/2013 | Kato | G01J 1/44 |
| | | | 315/159 |
| 2014/0001977 A1* | 1/2014 | Zacharchuk | H04B 7/0608 |
| | | | 315/291 |
| 2014/0285090 A1* | 9/2014 | Chemel | F21S 2/005 |
| | | | 315/131 |
| 2014/0312802 A1* | 10/2014 | Recker | H05B 47/19 |
| | | | 315/291 |
| 2017/0019970 A1* | 1/2017 | Chemel | F21S 8/04 |
| 2017/0086279 A1* | 3/2017 | Chemel | F21S 9/02 |
| 2017/0208671 A1* | 7/2017 | Kurihara | H05B 45/10 |
| 2018/0235059 A1* | 8/2018 | Kurihara | H05B 47/19 |
| 2018/0235061 A1* | 8/2018 | Kurihara | H05B 45/20 |
| 2018/0235062 A1* | 8/2018 | Kurihara | H04B 10/11 |
| 2019/0166676 A1* | 5/2019 | Maeda | H05B 45/24 |

* cited by examiner

COMMUNICATIONS DEVICE

CROSS REFERENCE TO RELATED APPLICATION

This application claims the benefit of priority of Japanese Patent Application Number 2018-063322 filed on Mar. 28, 2018, the entire content of which is hereby incorporated by reference.

BACKGROUND

1. Technical Field

The present disclosure relates to a communications device.

2. Description of the Related Art

Method for appending a route to a message including a short routing indicator across a piconet including a master and slaves is disclosed by Japanese Unexamined Patent Application Publication. (Translation of PCT Application) No. 2005-528852.

SUMMARY

When the communications protocols used by two local networks are mutually different, there is a demand to be able to stably perform processing for transmitting information between one of the local networks and the other.

In view of this, the present disclosure has an object to provide a communications device capable of stably performing processing for transmitting information between two different local networks.

In order to achieve the above object, a communications device according to one aspect of the present disclosure relays information between (i) one or more first devices included in a first network and (ii) one or more second devices included in a second network different from the first network, and includes: a first processor configured to wirelessly communicate with the one or more first devices via a first communications protocol; a second processor configured to wirelessly communicate with the one or more second devices via a second communications protocol different from the first communications protocol; and a controller configured to switch between causing the first processor to wirelessly communicate with the one or more first devices and causing the second processor to wirelessly communicate with the one or more second devices. The controller is further configured to: upon receipt of information from the one or more first devices, transmit the information from the one or more first devices to the one or more second devices and enter a single protocol state in which wireless communication is performed exclusively via the second communications protocol, until the communications device receives a response to the transmission; upon receipt of information from the one or more second devices, transmit the information from the one or more second devices to the one or more first devices and enter a single protocol state in which wireless communication is performed exclusively via the first communications protocol, until the communications device receives a response to the transmission; and upon receipt of either of the responses by the communications device, enter a multiprotocol state in which wireless communication is possible via the first, and second communications protocols.

According to the present disclosure, it is possible to stably perform processing for transmitting information between two different local networks.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
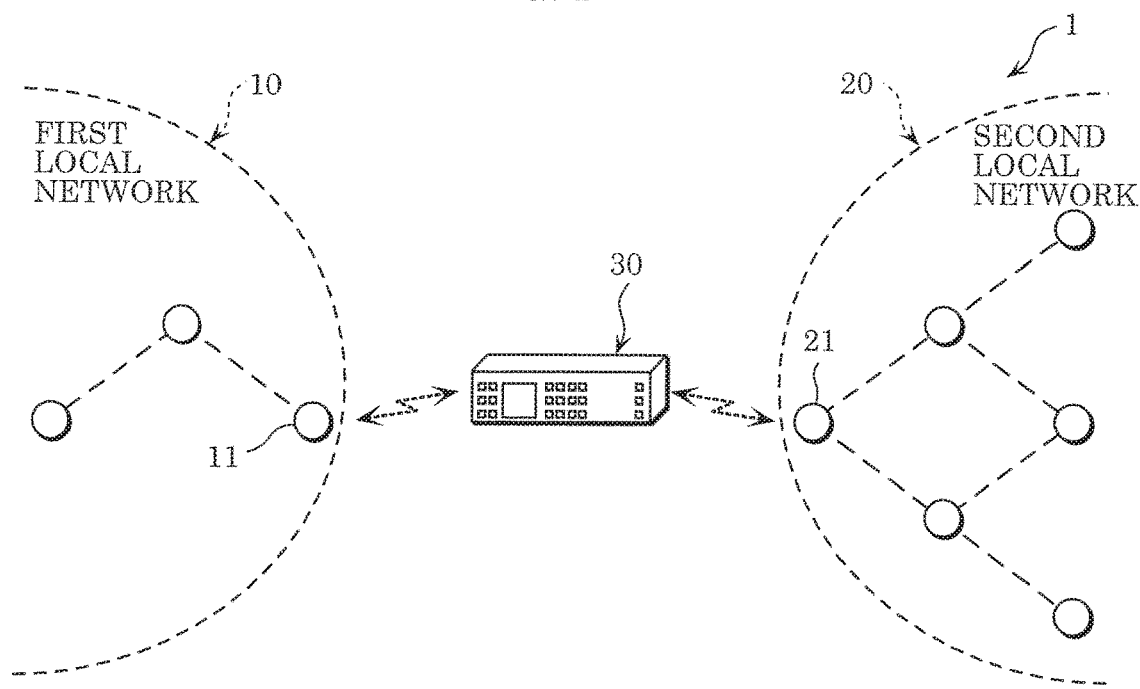
FIG. 1 schematically illustrates a lighting system according to an embodiment.

The following describes an embodiment with reference to the drawings. The embodiment described below shows a preferred, specific example of the present disclosure. The numerical values, shapes, materials, elements, the arrangement and connection of the elements, steps, order of the steps, etc., indicated in the following embodiment are mere examples, and therefore do not intend to limit the present disclosure. Therefore, among elements in the following embodiment, those not recited in any of the broadest, independent claims are described as optional elements.

Note that the drawings are represented schematically and are not necessarily precise illustrations. Additionally, like reference signs indicate like elements in the drawings, and overlapping descriptions thereof are omitted or simplified.

Hereinafter, a communications device and communications system according to an embodiment of the present disclosure will be described.

Embodiment (Configuration)

FIG. 1 schematically illustrates lighting system 1 according to the embodiment.

As illustrated in FIG. 1, lighting system 1 includes, for example, a plurality of lighting devices and communications device 30, each including a wireless communications function. In lighting system 1, a local network of a plurality of lighting devices is formed by adjacent lighting devices wirelessly communicating with each other and forming wireless communication paths. Here, a local network refers to a network of wireless communication paths between lighting devices. Lighting system 1 is one example of the communications system.

Lighting system 1 includes first local network 10, second local network 20, and communications device 30. When the communications protocol used in first local network 10 and the communications protocol used in second local network 20 are different, sharing of a control command for the lighting devices between first local network 10 and second local network 20 is enabled in lighting system 1. Here, the control command indicates a lighting scene in which one or more combinations of dimming control and color control parameters, such as for controlling the hue or color temperature of light, are reproduced by lighting devices. First local network 10 is one example of the first network, and second local network 20 is one example of the second network.

Note that in this embodiment, first local network 10 and second local network 20 are exemplified as being connected by wirelessly communicating via communications device 30, but a first mesh network may be used as an example of first local network 10, and a different, second mesh network may be used as an example of second local network 20.

(First Local Network)

First local network 10 is a local network that includes one or more first lighting devices 11, and is different from second local network 20. A portion of the one or more first lighting devices 11 are wirelessly communicably connected to communications device 30. Each first lighting device 11 is capable of communicating with a communications terminal capable of operating each first lighting device 11. In first local network 10, first lighting devices 11 wirelessly communicate with each other via a wireless communication method according to the first communications protocol. In this embodiment, the first communications protocol is ZigBee. First lighting device 11 is one example of the first device. Note that the first device is not limited to a lighting device, and may be some other device such as an air conditioner, printer, or smartphone, etc.

Figure 2:
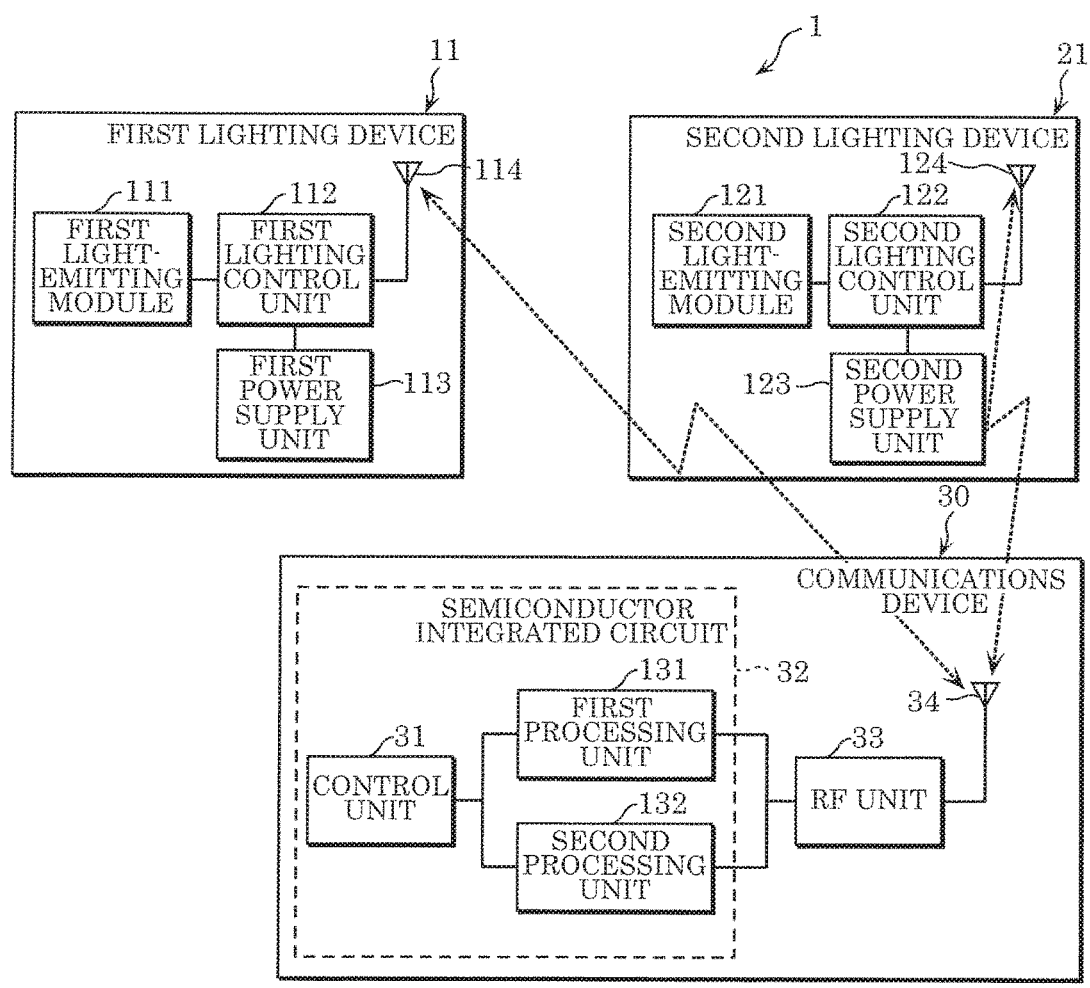
FIG. 2 is a block diagram of the lighting system according to the embodiment.

Each first lighting device 11 is, for example, a ceiling light or downlight, and is installed in a part of a building, such as a ceiling or a wall. As illustrated in FIG. 2, each first lighting device 11 includes first light-emitting module 111, first communications unit 114, first lighting control unit 112, and first power supply unit 113. FIG. 2 is a block diagram of lighting system 1 according to the embodiment.

The dimming and color of light emitted by first light-emitting module 111 is controlled by first lighting control unit 112. First light-emitting module 111 includes a substrate and a plurality of light-emitting elements mounted on the substrate.

The substrate is an approximately rectangular printed substrate for mounting the plurality of light-emitting elements. Examples of the substrate include a resin substrate including resin as a base material, a metal-based substrate including metal as a base material and a ceramic substrate including a ceramic material.

The light-emitting elements are mounted on the substrate. Each light-emitting element includes a light-emitting diode (LED). In this embodiment, each light-emitting element is an RGB LED element that emits red, green, and blue light. The light-emitting elements are not limited to RGB elements that emit three colors of red, green, and blue light; the light-emitting elements may be RGBW elements that emit four colors of red, green, blue, and white light, and may be BW elements emit two colors of blue and white light.

First communications unit 114 includes an antenna and a wireless module. First communications unit 114 in a given first lighting device 11 is disposed in a location at which wireless communication with communications device 30 is possible. First communications unit 114 receives information including, for example, a second control command indicating, for example, a lighting scene set in second local network 20, and transmits information including, for example, a first control command indicating, for example, a lighting scene set in first local network 10.

Moreover, first communications unit 114 in a given first lighting device 11 wirelessly communicates with first communications unit 114 included in a different first lighting device 11. This enables each first lighting device 11 to communicate with another proximally located first lighting device 11. The wireless communication method is, for example, WiFi (registered trademark), Bluetooth (registered trademark), or ZigBee (registered trademark) stipulated in IEEE 802.15.1. In this embodiment, wireless communication is performed using the 2.4 GHz frequency band.

In this embodiment, first local network 10 is a ZigBee network that employs mesh routing. ZigBee employs mesh routing to establish an optimal route within the network.

First lighting control unit 112 is electrically connected to first light-emitting module 111, first communications unit 114, and first power supply unit 113. For example, first lighting control unit 112 can control the dimming and color of light emitted by first light-emitting module 111 by controlling the dimming circuit and color adjustment circuit in first light-emitting module 111.

First lighting control unit 112 can be implemented using, for example, a microcomputer including a central processing unit (CPU). First lighting control unit 112 can perform predetermined lighting control operations by, for example, executing an appropriate program stored in a memory unit. The memory unit can be implemented using non-volatile semiconductor memory such as flash memory or electrically erasable and programmable read only memory (EEPROM).

First power supply unit 113 converts alternating current power supplied from a utility power supply into direct current power of a predetermined level by, for example, rectifying, smoothing, and stepping down the alternating current power, and supplies the converted direct current power to first light-emitting module 111 via first lighting control unit 112.

(Second Local Network)

Second local network 20 is a local network that includes one or more second lighting devices 21. A portion of the one or more second lighting devices 21 are wirelessly communicably connected to communications device 30. Each second lighting device 21 is capable of communicating with a communications terminal capable of operating each second lighting device 21. In second local network 20, second lighting devices 21 wirelessly communicate with each other via a wireless communication method according to a second communications protocol different from the first communications protocol. In this embodiment, the second communications protocol is Bluetooth. Second lighting device 21 is one example of the second device. Note that the second device is not limited to a lighting device, and may be some other device such as an air conditioner, printer, or smartphone, etc.

Each second lighting device 21 is, for example, a ceiling light or downlight, and is installed in a part of a building, such as a ceiling or a wall. Each second lighting device 21 includes second light-emitting module 121, second communications unit 124, second lighting control unit 122, and second power supply unit 123.

The dimming and color of light emitted by second light-emitting module 121 is controlled by second lighting control unit 122. Second light-emitting module 121 includes a substrate and a plurality of light-emitting elements mounted on the substrate.

The substrate is an approximately rectangular printed substrate for mounting the plurality of light-emitting elements. Examples of the substrate include a resin substrate including resin as a base material, a metal-based substrate including metal as a base material, and a ceramic substrate including a ceramic material.

The light-emitting elements are mounted on the substrate. Each light-emitting element includes a light-emitting diode (LED). In this embodiment, each light-emitting element is an RGB LED element that emits red, green, and blue light. The light-emitting elements are not limited to RGB elements that emit three colors of red, green, and blue light; the light-emitting elements may be RGBW elements that emit four colors of red, green, blue, and white light, and may be BW elements emit two colors of blue and white light.

Second communications unit 124 includes an antenna and a wireless module. Second communications unit 124 in a given second lighting device 21 is disposed in a location at which wireless communication with communications device 30 is possible. Second communications unit 124 receives information including, for example, a first control command indicating, for example, a lighting scene set in first local network 10, and transmits information including, for example, a second control command indicating, for example, a lighting scene set in second local network 20.

Moreover, second communications unit 124 in a given second lighting device 21 wirelessly communicates with second communications unit 124 included in a different second lighting device 21. This enables each second lighting device 21 to communicate with another proximally located second lighting device 21.

The wireless communication method is, for example, WiFi (registered trademark) stipulated in IEEE 802.11, or Bluetooth (registered trademark) or ZigBee stipulated in IEEE 802.15.1. In this embodiment, wireless communication is performed using the 2.4 GHz frequency band.

In this embodiment, second local network 20 is a Bluetooth (registered trademark) mesh network that employs managed flooding, which is for optimizing data to be forwarded to all nodes connected to second local network 20. For example, when a device broadcasts a message (packet), a device that receives the broadcast relays the broadcast to surrounding devices so that the message reaches all devices capable of communication. However, if unregulated, the message will flood the network. Accordingly, control is implemented that, for example, prevents a message that has been transmitted from being retransmitted or limits the number of times the message can be relayed.

Second lighting control unit 122 is electrically connected to second light-emitting module 121, second communications unit 124, and second power supply unit 123. For example, second lighting control unit 122 can control the dimming and color of light emitted by second light-emitting module 121 by controlling the dimming circuit and color adjustment circuit in second light-emitting module 121.

Second lighting control unit 122 can be implemented using, for example, a microcomputer including a CPU. Second lighting control unit 122 can perform predetermined lighting control operations by, for example, executing an appropriate program stored in a memory unit.

Second power supply unit 123 converts alternating current power supplied from a utility power supply into direct current power of a predetermined level by, for example, rectifying, smoothing, and stepping down the alternating current power, and supplies the converted direct current power to second light-emitting module 121 via second lighting control unit 122.

(Communications Device)

Communications device 30 is a gateway device that wirelessly connects one or more first lighting devices 11 included in first local network 10 with one or more second lighting devices 21 included in second local network 20, which is different from first local network 10. Note that communications device 30 may be a lighting device including such a gateway device.

Upon receiving information from a given lighting device from among the plurality of lighting devices included in one local network, communications device 30 focuses on performing predetermined processes including transmitting information to the end node among the plurality of lighting devices included in another local network, and responding to transmissions. Details regarding the single protocol state will be described later. Here, "responds" means, for example, send an acknowledgement (ACK).

Communications device 30 can reciprocally wirelessly communicate with first local network 10 that wirelessly communicates via the first communications protocol, and can reciprocally wirelessly communicate with second local network 20 that wirelessly communicates via the second communications protocol different from the first communications protocol. In other words, communications device 30 is capable of multiprotocol wireless communication. Note that in this embodiment, communications device 30 performs wireless communication using a single control unit 32.

With this communications device 30, a route may be established between a first lighting device 11 functioning as a start node among the one or more first lighting devices 11 included in first local network 10 and a second lighting device 21 functioning as a end node among the one or more second lighting devices 21 included in second local network 20.

Here, a start node refers to a node that is the point of departure of information to be transmitted to the end node, and is also referred to as a source. An end node refers to a node that is the point of arrival of information output by the start node, and is also referred to as a destination.

Communications device 30 includes a single semiconductor integrated circuit 32, third communications unit 34, and radio frequency (RF) unit 33.

The single semiconductor integrated circuit 32 is a single IC chip. Semiconductor integrated circuit 32 is configured of, for example, a microprocessor, ROM, and RAM. Semiconductor integrated circuit 32 includes control unit 31 (one example of the controller), first processing unit 131 (one example of the first processor), and second processing unit 132 (one example of the second processor).

Control unit 31 is a host controller that controls processes performed by, for example, first processing unit 131 and second processing unit 132 included in communications device 30. Control unit 31 includes the top five layers of the open systems interconnection (OSI) reference model. First processing unit 131 and second processing unit 132 are included in the bottom physical layer of the OSI reference model.

First processing unit 131 is connected between control unit 31 and RF unit 33. First processing unit 131 wirelessly communicates with one or more first lighting devices 11 included in first local network 10 via the first communications protocol. First processing unit 131 uses a communications protocol that does not include an IP stack. Examples of communications protocols that do not include an IP stack include ZigBee and Bluetooth. An IP stack is a stack of IP layers capable of analyzing IP. In this embodiment, first processing unit 131 is a ZigBee chip for performing wireless communication via the first communications protocol, i.e., ZigBee.

First processing unit 131 transmits the second control command and receives the first control command to and from first lighting device 11 by wirelessly communicating with first lighting device 11 via RF unit 33 and third communications unit 34, using the first communications protocol.

Second processing unit 132 is connected in parallel with first processing unit 131 between control unit 31 and RF unit 33. Second processing unit 132 wirelessly communicates with one or more second lighting devices 21 included in second local network 20 via the second communications protocol. In other words, second processing unit 132 uses a communications protocol that is different from the communications protocol used by first processing unit 131. Second processing unit 132 uses a communications protocol that does not include an IP stack. In this embodiment, second processing unit 132 is a Bluetooth chip for performing wireless communication via the second communications protocol, i.e., Bluetooth.

Second processing unit 132 transmits the first control command and receives the second control command to and from one or more second lighting devices 21 by wirelessly communicating with one or more second lighting devices 21 via RF unit 33 and third communications unit 34, using the second communications protocol.

Accordingly, control unit 31 switches between causing first processing unit 131 to wirelessly communicate with one or more first lighting devices 11 and causing second processing unit 132 to wirelessly communicate with one or more second lighting devices 21. When first processing unit 131 receives a first control command from one or more first lighting devices 11, control unit 31 causes second processing unit 132 to transmit the first control command to one or more second lighting devices 21 via the second communications protocol. When second processing unit 132 receives a second control command from one or more second lighting devices 21, control unit 31 causes first processing unit 131 to transmit the second control command to one or more first lighting devices 11 via the first communications protocol.

Moreover, when control unit 31 receives information from first lighting device 11 or second lighting device 21, control unit 31 enters a single protocol state to focus on processing the information. More specifically, when control unit 31 receives information from first lighting device 11, control unit 31 transmits information to second lighting device 21 and enters a single protocol state in which wireless communication is exclusively performed with second local network 20 via second processing unit 132, until communications device 30 receives a response to the transmission. Similarly, when control unit 31 receives information from second lighting device 21, control unit 31 transmits information to first lighting device 11 and enters a single protocol state in which wireless communication is exclusively performed with first local network 10 via first processing unit 131, until communications device 30 receives a response to the transmission.

This will be described with reference to FIG. 3A, FIG. 3B, FIG. 4A, and FIG. 4B.

Figure 3A:
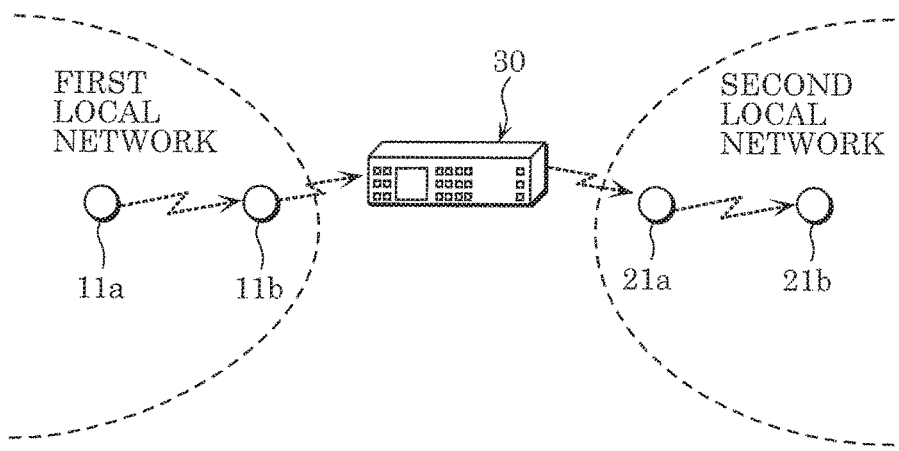
FIG. 3A schematically illustrates the transmission of information from a first local network toward a second local network.
Figure 3B:
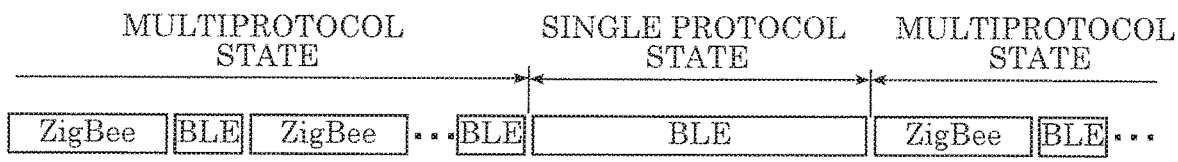
FIG. 3B schematically illustrates a scan window of a communications device illustrated in FIG. 3A.

FIG. 3A schematically illustrates information being relayed from first local network 10 toward second local network 20. FIG. 3B schematically illustrates a scan window for communications device 30 in FIG. 3A.

In the examples illustrated in FIG. 3A and FIG. 3B, first local network 10 is exemplified as including two first lighting devices 11, namely first lighting device 11a and 11b, and second local network 20 is exemplified as including two second lighting devices 21, namely second lighting device 21a and 21b. Note that the number of first lighting devices 11 and the number of second lighting devices 21 used are not limited to these examples. Here, the start node is first lighting device 11a in first local network 10, and the end node is second lighting device 21b in second local network 20. Information for establishing a route from the start node (first lighting device 11a to the end node (second lighting device 21b) is output from first lighting device 11a.

Information in first local network 10 includes, for example, a source address indicating the start node, a registry ID, a destination address indicating the end node, a sequence number, a time to live (TTL), and a payload. The TTL includes the default value and the hop count value.

First, in lighting system 1, when information hops from first lighting device 11a to first lighting device 11b in first local network 10 and is then relayed from first lighting device 11b to communications device 30, control unit 31 enters a single protocol state in which wireless communication is exclusively performed with second local network 20 via second processing unit 132. In other words, control unit 31 enters a state in which wireless communication is performed via second communications protocol, and does not wirelessly communicate via the first communications protocol.

While control unit 31 is in the single protocol state, if communications device 30 receives information wirelessly via a communications protocol other than the communications protocol used by the destination, communications device 30 may delete the information. Moreover, if communications device 30 wirelessly receives, via the same communications protocol as the communications protocol used by the destination, information other than the information to be transmitted to the end node, communications device 30 may delete the information without extending the single protocol state. In other words, in the single protocol state, if information other than a response to the information transmitted to the end node is received, the information is not processed.

Note that the source address, destination address, sequence number, TTL, etc., in the information for second local network 20 may be kept the same as the source address, destination address, sequence number, TTL, etc., in the information for first local network 10 when it is relayed by communications device 30. In other words, control unit 31 in communications device 30 may relay the information received from first local network 10 to second local network 20.

Information is relayed to the end node, which is second lighting device 21b, as a result of control unit 31 transmitting the information to second lighting device 21a in second local network 20 via second processing unit 132. When the information hops from second lighting device 21a to second lighting device 21b, the destination address included in the information indicates second lighting device 21*b*, which is a match. Then second lighting device 21*b* responds to first lighting device 11*a*, which is the start node. Similarly, in second local network 20, the information hops from second lighting device 21*b* to second lighting device 21*a*, and then hops from second lighting device 21*a* to communications device 30. In this way, the response from second lighting device 21*b* is relayed to communications device 30.

When communications device 30 receives the response, control unit 31 enters a multiprotocol state in which wireless communication is possible with both first local network 10 and second local network 20. The multiprotocol state is a state in which wireless communication can be performed via the second communications protocol, i.e., Bluetooth Low Energy (BLE), and wireless communication can be performed via the first communications protocol, i.e., ZigBee. While in the multiprotocol state, wireless communication is performed intermittently between the first communications protocol and the second communications protocol. Communications device 30 transmits the received response to first lighting device 11*a* via the first communications protocol used by first local network 10.

When communications device 30 does not receive a response to the information within a predetermined period, control unit 31 enters the multiprotocol state in which wireless communication is possible with both first local network 10 and second local network 20. When the predetermined period starting when information is transmitted to the end node has elapsed, it can be assumed that the information has not reached the end node or that the information has reached the end node but a response will not come. By using a predetermined period to establish a timeout, processing by control unit 31 can be kept from becoming delayed in communications device 30.

Furthermore, after receiving information from first lighting device 11, control unit 31 may calculate a predetermined period (one example of the first predetermined period) from transmission of information to second lighting device 21 until communications device 30 receives a response to the transmission, based on the time it takes to perform one hop and the hop count. Similarly, after receiving information from second lighting device 21, control unit 31 may calculate a predetermined period (one example of the second predetermined period) from transmission of information to first lighting device 11 until communications device 30 receives a response to the transmission, based on the time it takes to perform one hop and the hop count. For example, when the time required to perform one hop is expressed as t and the hop count is expressed as n, the predetermined period can be calculated as t×n.

Figure 4A:
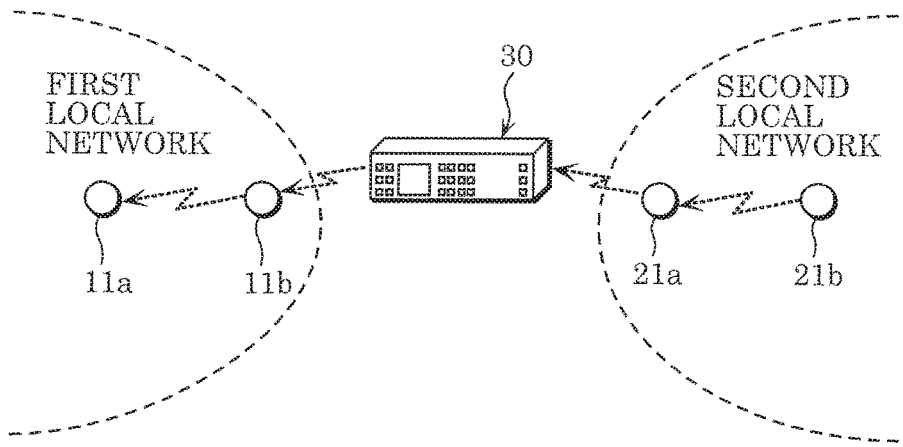
FIG. 4A schematically illustrates the transmission of information from the second local network toward the first local network.
Figure 4B:
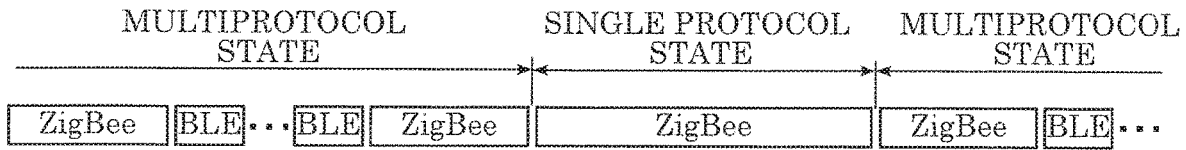
FIG. 4B schematically illustrates a scan window of the communications device illustrated in FIG. 4A.

FIG. 4A schematically illustrates information being relayed from second local network 20 toward first local network 10. FIG. 4B schematically illustrates a scan window for communications device 30 in FIG. 4A.

The settings used in the examples illustrated in FIG. 4A and FIG. 4B are the same as those in FIG. 3A and FIG. 3B. Here, the start node is second lighting device 12*b* in second local network 20, and the end node is first lighting device 11*a* in first local network 10. Information for establishing a route from the start node (second lighting device 12*b*) to the end node (first lighting device 11*a*) is output from second lighting device 12*b* and relayed to first lighting device 11*a*. The order of the processes performed in the example illustrated in FIG. 4A and FIG. 4B are merely reversed relative to the order of the processes performed in the example illustrated in FIG. 3A and FIG. 3B. Since the same processing is performed, repeated description will be omitted.

Next, we will return to the description of control unit 31. In this embodiment, when communication is performed between first lighting device 11 and communications device 30 via ZigBee, control unit 31 obtains the first control command obtained by first processing unit 131 from the one or more first lighting devices 11. Control unit 31 outputs the first control command obtained via ZigBee by first processing unit 131 to second processing unit 132. Second processing unit 132 transmits the obtained first control command to one or more second lighting devices 21 via Bluetooth.

Moreover, control unit 31 performs wireless communication using first processing unit 131 and performs wireless communication using second processing unit 132 temporally mutually exclusively. More specifically, first processing unit 131 and second processing unit 132 intermittently receive control commands in fixed reception intervals and reception windows (see FIG. 6 to be described later). In this embodiment, the reception window in which first processing unit 131 can receive the first control command is referred to as a scan window, and the reception interval between scan windows is referred to as a scan interval. The same applies to second processing unit 132. In this embodiment, the scan window of first processing unit 131 and the scan window of second processing unit 132 are temporally mutually exclusive. Naturally, since communications device 30 intermittently transmits control commands per scan interval, unless the scan window overlaps with the timing of the transmission of control command of first lighting device 11 or second lighting device 20, communications device 30 cannot receive control commands. Accordingly, in this embodiment, ZigBee communication between one or more first lighting devices 11 and communications device 30 and Bluetooth communication between one or more second lighting devices 21 and communications device 30 are temporally mutually exclusive and performed alternately. Note that where the terminology "control command" is used herein, it is used to collectively refer to both the first and second control commands.

Third communications unit 34 is connected to RF unit 33. Third communications unit 34 is a wireless communications antenna that transmits and receives control commands to and from one or more first lighting devices 11 and one or more second lighting devices 21. Moreover, third communications unit 34 can wirelessly communicate with first communications unit 114 and can wirelessly communicate with second communications unit 124.

Upon receipt of a control command from first processing unit 131 or second processing unit 132, RF unit 33, for example, filters and amplifies the control command, and outputs it to third communications unit 34. RF unit 33 filters the first control command received from the one or more first lighting devices 11 via third communications unit 34, outputs the result to first processing unit 131, filters the second control command received from the one or more second lighting devices 21 via third communications unit 34, and outputs the result to second processing unit 132.

RF unit 33 includes a transmission circuit and a reception circuit. The transmission circuit includes, for example, for control commands it is to transmit, a transmission filter that extracts a transmission band signal indicated in the control command, a transmission mixer that up-converts a signal output from the transmission filter into a high frequency signal, and a preamplifier that amplifies the up-converted high frequency signal. The reception circuit includes, for example, a reception mixer that converts a high frequency signal received by third communications unit 34 from the one or more first lighting devices 11 and the one or more second lighting devices 21, into a low frequency signal.

Note that communications device 30 is merely one example and may be installed in a lighting device or installed, in a device such as a speaker, air conditioner, printer, or smartphone, etc.

(Operations)

Next, operations performed by lighting system 1 will be described.

Figure 5:
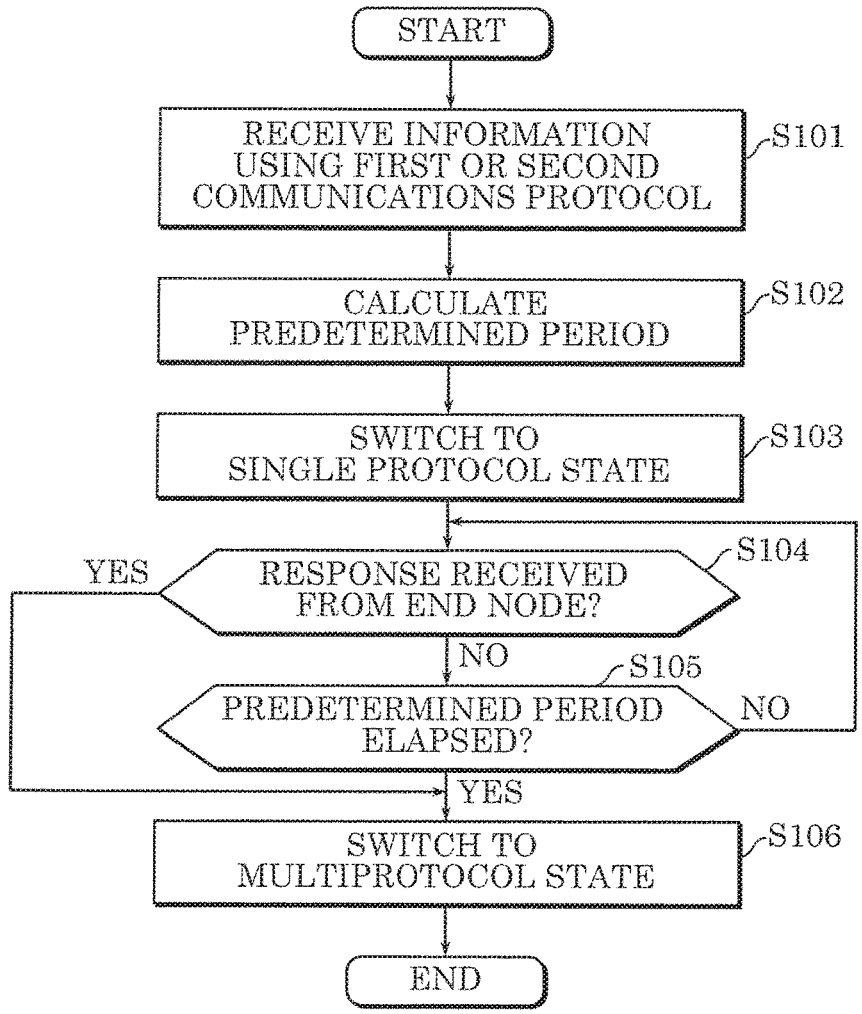
FIG. 5 is a flow chart that illustrates operations performed by the communications device according to the embodiment.

FIG. 5 is a flowchart of operations performed by communications device 30 according to this embodiment. In FIG. 5, the first communications protocol used in first local network 10 is ZigBee, and the second communications protocol used in second local network 20 is Bluetooth. Moreover, it is assumed that communications device 30 is currently in the multiprotocol state.

As illustrated in FIG. 5, first, communications device 30 receives information either via the first communications protocol or the second communications protocol (S101). More specifically, in the example illustrated in FIG. 3A, communications device 30 receives, from first lighting device 11b, information that has hopped from first lighting device 11a to first lighting device 11b. In the example illustrated in FIG. 4A, communications device 30 receives, from second lighting device 21a, information that has hopped from second lighting device 21b to second lighting device 21a.

Next, communications device 30 calculates a predetermined period based on the time it takes to perform one hop and the hop count (S102). More specifically, after receiving information from first lighting device 11, control unit 31 calculates a predetermined period (one example of the first predetermined period) from transmission of information to second lighting device 21 until communications device 30 receives a response to the transmission, based on the time it takes to perform one hop and the hop count. Similarly, after receiving information from second lighting device 21, control unit 31 calculates a predetermined period (one example of the second predetermined period) from transmission of information to first-lighting device 11 until communications device 30 receives a response to the transmission, based on the time it takes to perform one hop and the hop count. Note that the calculation of the predetermined period may be performed any time before step S104, and need not be performed in step S102.

Next, upon receiving the information, communications device 30 enters a single protocol state in which only wireless communication via the communications protocol used by the destination is performed (S103). More specifically, when communications device 30 in FIG. 3A and FIG. 3B receives the information via the first communications protocol, communications device 30 enters a single protocol state in which exclusively wireless communication with second local network 20 via the second communications protocol is performed (i.e., switches from the multiprotocol state to a single protocol state). In such cases, communications device 30 does not wirelessly communicate via any communications protocol other than the second communications protocol used by second local network 20, which is the destination. Similarly, when communications device 30 in FIG. 4A and FIG. 4B receives the information via the second, communications protocol, communications device 30 enters a single protocol state in which exclusively wireless communication with first local, network 10 via the first communications protocol is performed (i.e., switches from the multiprotocol state to a single protocol state). In such cases, communications device 30 does not wirelessly communicate via any communications protocol other than the first communications protocol used by first local network 10, which is the destination. While in a single protocol state, communications device 30 performs processes related to transmission of information from communications device 30 and reception of a response from second lighting device 21b.

Next, communications device 30 determines whether a response has been received from end node or not (S104).

When a response from the end node has been received (YES in S104), communications device 30 switches from a single protocol state to the multiprotocol state (S106). Communications device 30 then ends the processing.

When a response from the end node has not been received (NO in S104), communications device 30 determines whether the predetermined period has elapsed or not since transmission of the information to the end node (S105).

When the predetermined period has elapsed since the transmission of the information to the end node (YES in S105), communications device 30 switches from a single protocol state to the multiprotocol state (S106). This completes the flow of processes.

However, when the predetermined period has not elapsed since the transmission of the information to the end node (NO in S105), communications device 30 returns to step S104 and performs the processes again.

Next, an example will be given in which a control command is transmitted from one or more first lighting device 11 included in first local network 10 to one or more second lighting device 21 included in second local network 20.

Figure 6:
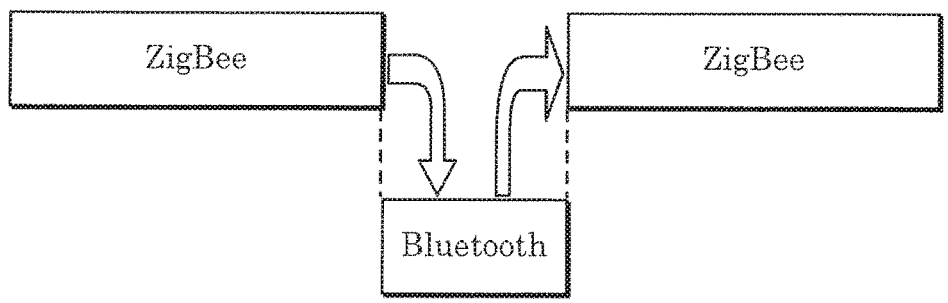
FIG. 6 illustrates operations performed by the communications device in a lighting system according to the embodiment.
Figure 7:
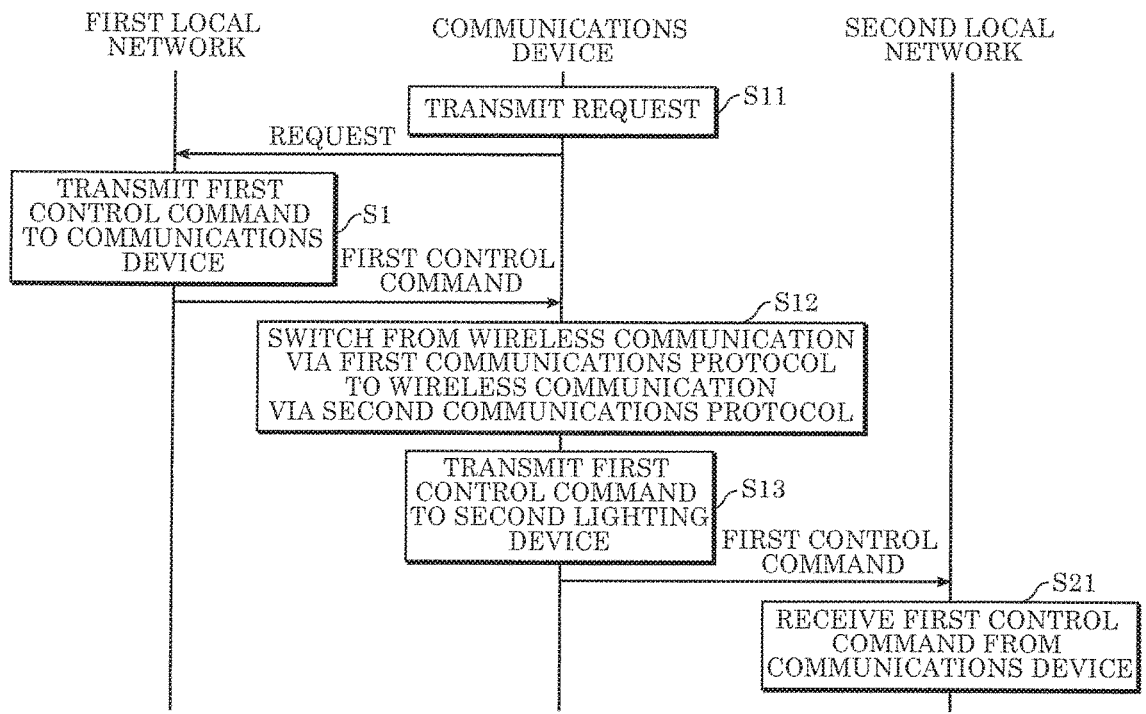
FIG. 7 is a sequence chart illustrating operations performed by the lighting system according to the embodiment.

FIG. 6 illustrates operations performed by communications device 30 in lighting system 1 according to the embodiment. FIG. 7 is a sequence chart illustrating operations performed by lighting system 1 according to the embodiment.

Here, an example will be given in which a first control command, which is one example of the information, is transmitted from one or more first lighting devices 11 included in first local network 10 to one or more second lighting devices 21 included in second local network 20 as a result of a user operating a control terminal, as illustrated in FIG. 7.

First, communications device 30 transmits a request to one or more first lighting devices 11 included in first local network 10 to obtain the first control command indicating a lighting scene set by the user and to be reproduced by one or more first lighting devices 11 (S11). More specifically, control unit 31 transmits a request to one or more first lighting devices 11 via third communications unit 34.

Next, as illustrated in FIG. 6 and FIG. 7, when one or more first lighting devices 11 receive, via first communications unit 114, the request transmitted by communications device 30, the one or more first lighting devices 11 transmit the first control command to communications device 30 (S1).

Next, communications device 30 receives the first control command. Control unit 31 in communications device 30 switches from performing wireless communication via the first communications protocol to performing wireless communication via the second communications protocol (S12). In other words, control unit 31 causes second processing unit 132 to transmit, via Bluetooth, to one or more second lighting devices 21 included in second local network 20, the first control command obtained by first processing unit 131 via ZigBee communication between one or more first lighting devices 11 and communications device 30. Note that here, communications device 30 stores the received first control command into a storage unit such as memory, and emits light according to the lighting scene indicated in the first control command.

Next, control unit 31 causes second processing unit 132 to transmit, via the second communications protocol, the first control command received from one or more first lighting devices 11 via third communications unit 34, to one or more second lighting devices 21 included in second local network 20 (S13). In other words, second processing unit 132 transmits, via third communications unit 34, the first control command to one or more second lighting devices 21 using the second communications protocol.

Next, one or more second lighting devices 21 receive the first control command from communications device 30 via second communications unit 124 (S21). This completes the processing.

Next, an example will be given in which a control command is transmitted to one or more first lighting devices 11 included in first local network 10 from one or more second lighting devices 21 included in second local network 20.

Figure 8:
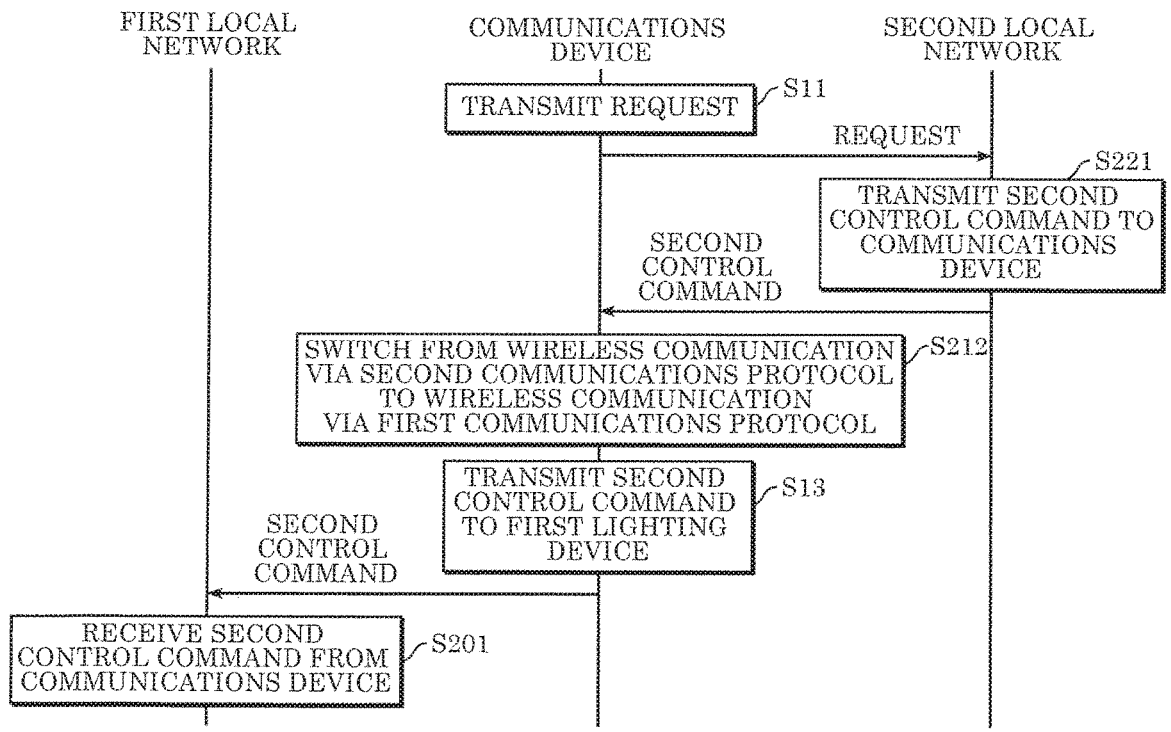
FIG. 8 is a sequence chart illustrating operations performed by the lighting system according to the embodiment.

FIG. 8 is a sequence chart illustrating operations performed by lighting system 1 according to the embodiment.

First, as illustrated in FIG. 8, communications device 30 transmits a request to one or more second lighting devices 21 included in second local network 20 to obtain the second control command indicating a lighting scene set by the user and to be reproduced by one or more second lighting devices 21 (S11). The second control command is one example of the information.

Next, when one or more second lighting devices 21 receive, via second communications unit 124, the request transmitted by communications device 30, the one or more second lighting devices 21 transmit the second control command to communications device 30 (S221).

Next, communications device 30 receives the second control command. Control unit 31 in communications device 30 switches from performing wireless communication via the second communications protocol to performing wireless communication via the first communications protocol (S212). In other words, control unit 31 causes first processing unit 131 to transmit, via ZigBee, to one or more first lighting devices 11 included in first local network 10, the second control command obtained by second processing unit 132 via Bluetooth between one or more second lighting devices 21 and communications device 30. Note that here, communications device 30 stores the received second control command into a storage unit such as memory, and emits light according to the lighting scene indicated in the second control command.

Next, control unit 31 causes first processing unit 131 to transmit, via the first communications protocol, the second control command received from one or more second lighting devices 21 via third communications unit 34, to one or more first lighting devices 11 included in first local network 10 (S13). In other words, first processing unit 131 transmits, via third communications unit 34, the second control command to one or more first lighting devices 11 using the first communications protocol.

Next, one or more first lighting devices 11 receive the second control command from communications device 30 via first communications unit 114 (S201). This completes the processing.

With this, as illustrated in FIG. 7 and FIG. 8, in lighting system 1, first local network 10 and second local network 20, which are mutually different, can wirelessly communicate.

(Operational Advantages)

Next, the operational advantages of communications device 30 according to this embodiment will be described.

As described above, communications device 30 according to this embodiment relays information between one or more first lighting devices 11 included in first local network 10 and one or more second lighting devices 21 included in second local network 20 different from first local network 10. Communications device 30 includes: first processing unit 131 that wirelessly communicates with the one or more first lighting devices 11 via a first communications protocol; second processing unit 132 that wirelessly communicates with the one or more second lighting devices 21 via a second communications protocol different from the first communications protocol; and control unit 31 that switches between causing first processing unit 131 to wirelessly communicate with the one or more first lighting devices 11 and causing the second processing unit 132 to wirelessly communicate with the one or more second lighting devices 21. Control unit 31 further: upon receipt of information from the one or more first lighting devices 11, transmits the information from the one or more first lighting devices 11 to the one or more second lighting devices 21 and enters a single protocol state in which wireless communication is performed exclusively via the second communications protocol, until communications device 30 receives a response to the transmission; upon receipt of information from the one or more second lighting devices 21, transmits the information from the one or more second lighting devices 21 to the one or more first lighting devices 11 and enters a single protocol state in which wireless communication is performed exclusively via the first communications protocol, until communications device 30 receives a response to the transmission; and upon receipt of either of the responses by communications device 30, enters a multiprotocol state in which wireless communication is possible via the first and second communications protocols.

For example, in the multiprotocol state in which wireless communication is performed intermittently between the first communications protocol and the second communications protocol, there is concern that the response will be dropped. In one example, when information is transmitted to first lighting device 11 via the first communications protocol, the response is required to be received via the first communications protocol, but when the scan window corresponds to the second communications protocol, the response may be dropped.

However, according to this embodiment, as a result of communications device 30 receiving information from first lighting device 11 or second lighting device 21, control unit 31 enters a single protocol state in which wireless communication is performed exclusively with first local network 10 via first processing unit 131 or exclusively with second local network 20 via second processing unit 132. Moreover, when communications device 30 receives a response, control unit 31 enters a multiprotocol state in which wireless communication is possible with both first local network 10 and second local network 20. In this way, when information is received from one network, control unit 31 enters a single protocol state to focus on processes to be performed until the response is received from the destination network, and thus stable processing can be performed during that period.

Accordingly, with this communications device 30, it is possible to perform stable processing in network communications.

In particular, with this communications device 30, since focus is placed on each process, one by one, and information is not received from another network while in the single protocol state, compared to when a plurality of processes are performed in parallel, processing load is reduced, which makes it possible to inhibit a reduction in processing speed.

Moreover, in communications device 30 according to this embodiment, when, within a predetermined period, control unit 31 transmits the information and does not receive the response to the transmission while in the respective single protocol state, control unit 31 enters the multiprotocol state in which wireless communication is possible via the first and second communications protocols.

With this, when control unit 31 fails to receive a response even after the predetermined period has elapsed, control unit 31 can inhibit a reduction in processing speed by switching from the single protocol state to the multiprotocol state. In other words, with communications device 30, it is possible to inhibit congestion of processing by switching back to the multiprotocol state in which wireless communication is possible with both first local network 10 and second local network 20 and perform processing for other information.

Moreover, in communications device 30 according to this embodiment, control unit 31 further: after receiving the information from the one or more first lighting devices 11, calculates, as the predetermined period, a first predetermined period based on an amount of time required to perform one hop and a hop count within the second network, the first predetermined period being a period of time communications device 30 is to wait after transmission of the information to the one or more second lighting devices 21 for the response to the transmission; and after receiving the information from the one or more second lighting devices 21, calculates, as the predetermined period, a second predetermined period based on an amount of time required to perform one hop and a hop count within the first network, the second predetermined period being a period of time communications device 30 is to wait after transmission of the information to the one or more first lighting devices 11 for the response to the transmission.

With this, control unit 31 can optimize the predetermined period by calculating the predetermined period based on the time required for one hop and the hop count. Accordingly, with communications device 30, it is possible to inhibit a reduction in processing speed.

Moreover, in communications device 30 according to this embodiment the first communications protocol is ZigBee, and the second communications protocol is Bluetooth.

Moreover, in communications device 30 according to this embodiment, the first network and the second network are each a local network or a mesh network.

Moreover, the communications system according to this embodiment includes a communications device, one or more first lighting devices 11, and one or more second lighting devices 21.

Moreover, lighting system 1 according to this embodiment includes a lighting device including communications device 30 and a light-emitting module that emits light, one or more first devices each of which is first lighting device 11, and one or more second devices each of which is second lighting device 21.

(Other Variations, Etc.)

Hereinbefore, the present disclosure has been described based on an embodiment, but the present disclosure is not limited to the communications device described above.

For example, in the communications device according to the above embodiment, the control unit is exemplified as, but not limited to, being connected to the first processing unit and the second processing unit in the semiconductor integrated circuit in FIG. 2; the control unit may be connected to the RF unit. In such cases, it is possible to obtain control commands from the RF unit.

Moreover, in the communications device according to the above embodiment, a buffer may be provided between (i) first processing unit and second processing unit and (ii) the RF unit. The buffer may temporarily store information received from one or more first lighting devices until it is to be forwarded to one or more second lighting devices, and upon being transmitted to one or more second lighting devices, the information may be deleted from the buffer. Similarly, the buffer may temporarily store formation received from one or more second lighting devices until it is to be forwarded to one or more first lighting devices, and upon being transmitted to one or more first lighting devices, the information may be deleted from the buffer.

Moreover, each component included in the communications device according to the above embodiments is generally realized as an LSI circuit, which is an integrated circuit. Each of these components may be individually realized as a single chip, or a portion or all of the processing units may be realized as a single chip.

Moreover, circuit, integration is not limited to LSI, the components may be realized as a dedicated circuit or generic processor. A field programmable gate array (FPGA) that is programmable after manufacturing of the LSI circuit, or a reconfigurable processor whose connections and settings regarding circuit cells in the LSI circuit are reconfigurable, may be used.

One or more of the elements in the above embodiment may be configured from dedicated hardware, or may be realized by executing a software program suitable for the element. One or more of the elements may be realized by means of a program executing unit, such as a CPU and a processor, reading and executing the software program recorded on a recording medium such as a hard disk or a semiconductor memory.

Moreover, all of the values used above are mere examples presented for illustratively describing the present disclosure in detail; the embodiments of the present disclosure are not limited to the exemplary values.

Moreover, the block diagrams illustrate one example of the division of functional blocks; a plurality of functional blocks may be realized as a single functional block, a single functional block may be broken up into a plurality of functional blocks, and part of one function may be transferred to another functional block. Moreover, the functions of a plurality of function blocks having similar functions may be processed by a single piece of hardware or software in parallel or by time-division.

Moreover, the sequence in which the steps are executed in the flow charts are mere examples presented for illustratively describing the present disclosure in detail; the steps may be executing in a different order. Moreover, some of the steps may be executed at the same time as (in parallel with) other steps.

Embodiments arrived at by a person skilled in the art making various modifications to any one of the above embodiments as well as embodiments realized by arbitrarily combining structural components and functions in Embodiments 1 and 2 which do not depart from the essence of the present disclosure are included in the present disclosure.

What is claimed is:

1. A communications device that relays information between (i) one or more first devices included in a first network and (ii) one or more second devices included in a second network different from the first network, the communications device comprising:

a first processor configured to wirelessly communicate with the one or more first devices via a first communications protocol;
a second processor configured to wirelessly communicate with the one or more second devices via a second communications protocol different from the first communications protocol; and
a controller configured to switch between causing the first processor to wirelessly communicate with the one or more first devices and causing the second processor to wirelessly communicate with the one or more second devices,
wherein the controller is further configured to:
  upon receipt of information from the one or more first devices, transmit the information from the one or more first devices to the one or more second devices and enter a single protocol state in which wireless communication is performed exclusively via the second communications protocol, until the communications device receives a response to the transmission;
  upon receipt of information from the one or more second devices, transmit the information from the one or more second devices to the one or more first devices and enter a single protocol state in which wireless communication is performed exclusively via the first communications protocol, until the communications device receives a response to the transmission; and
  upon receipt of either of the responses by the communications device, enter a multiprotocol state in which wireless communication is possible via the first and second communications protocols,
wherein
  when, within a predetermined period, the controller transmits the information and does not receive the response to the transmission while in the respective single protocol state, the controller is configured to enter the multiprotocol state in which wireless communication is possible via the first and second communications protocols, wherein the controller is further configured to:
  after receiving the information from the one or more first devices, calculate, as the predetermined period, a first predetermined period based on an amount of time required to perform one hop and a hop count within the second network, the first predetermined period being a period of time the communications device is to wait after transmission of the information to the one or more second devices for the response to the transmission; and
  after receiving the information from the one or more second devices, calculate, as the predetermined period, a second predetermined period based on an amount of time required to perform one hop and a hop count within the first network, the second predetermined period being a period of time the communications device is to wait after transmission of the information to the one or more first devices for the response to the transmission.

2. The communications device according to claim 1, wherein
  the first communications protocol is ZigBee, and
  the second communications protocol is Bluetooth.

3. The communications device according to claim 1, wherein
  each of the first network and the second network is one of a local network and a mesh network.

4. A communications system, comprising:
  the communications device according to claim 1;
  the one or more first devices; and
  the one or more second devices.

5. A lighting system, comprising:
  a lighting device including the communications device according to claim 1 and a light-emitting module that emits light;
  the one or more first devices, wherein each of the one or more first devices is a first lighting device; and
  the one or more second devices, wherein each of the one or more second devices is a second lighting device.

* * * * *